United States Patent
Kano

(10) Patent No.: US 10,284,748 B2
(45) Date of Patent: May 7, 2019

(54) IMAGE PROCESSING SYSTEM AND IMAGE PROCESSING PROGRAM

(71) Applicant: KONICA MINOLTA, INC., Chiyoda-ku, Tokyo (JP)

(72) Inventor: Takahiro Kano, Toyonaka (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/690,385

(22) Filed: Aug. 30, 2017

(65) Prior Publication Data

US 2018/0077317 A1    Mar. 15, 2018

(30) Foreign Application Priority Data

Sep. 9, 2016    (JP) .................................. 2016-176585

(51) Int. Cl.
*G06K 15/00* (2006.01)
*H04N 1/44* (2006.01)
*H04N 1/00* (2006.01)

(52) U.S. Cl.
CPC ....... *H04N 1/4413* (2013.01); *H04N 1/00129* (2013.01); *H04N 1/00344* (2013.01); *H04N 2201/0094* (2013.01)

(58) Field of Classification Search
CPC ............. H04N 1/4413; H04N 1/00129; H04N 2201/0094; H04N 2201/3233; H04N 2201/3236; H04N 2201/324
See application file for complete search history.

(56) References Cited

U.S. PATENT DOCUMENTS

| | | | | |
|---|---|---|---|---|
| 2008/0256459 A1* | 10/2008 | Sekiya | .................... | G06F 21/32 715/741 |
| 2009/0213415 A1* | 8/2009 | Shozaki | ................. | G06K 15/02 358/1.15 |
| 2010/0014110 A1* | 1/2010 | Munetomo | .......... | H04N 1/0084 358/1.14 |
| 2014/0033090 A1* | 1/2014 | Yamada | ................ | G06F 3/0484 715/764 |

FOREIGN PATENT DOCUMENTS

| | | |
|---|---|---|
| JP | 08-083153 A | 3/1996 |
| JP | 2011-238006 A | 11/2011 |
| JP | 2012-190400 A | 10/2012 |

* cited by examiner

*Primary Examiner* — Moustapha Diaby
(74) *Attorney, Agent, or Firm* — Buchanan Ingersoll & Rooney PC

(57) ABSTRACT

An image processing system includes: an image processor having an image print function; and a server part, wherein the image processing system is connectable to a display part that displays a screen, and the server part determines whether acquisition of request information to be requested for printing is necessary, on the basis of a print mode of a print job, and generates a first screen for receiving a user operation for inputting the request information as the screen when the acquisition is necessary and generates a second screen different from the first screen when the acquisition is unnecessary.

17 Claims, 11 Drawing Sheets

FIG. 6

```
javascript:(function(){
//INPUT USER NAME
n=document.getElementsByName("username");
n.item(0).value="usernameXXX";
//INPUT PASSWORD
p=document.getElementsByName("password");
p.item(0).value="passwordXXX";
//PRESS BUTTON
f=document.getElementsByTagName('form');
f.item(0).submit();
})();
```

IMAGE PROCESSING SYSTEM AND IMAGE PROCESSING PROGRAM

Japanese Patent Application No. 2016-176585 filed on Sep. 9, 2016, including description, claims, drawings, and abstract the entire disclosure is incorporated herein by reference in its entirety.

BACKGROUND

Technological Field

The present invention relates to an image processing system and an image processing program, and especially relates to an image processing system and an image processing program for processing a print job of an image.

Description of the Related Art

In the related art, methods of managing print jobs by a print server have been proposed. The print server manages a print job received from a personal computer (PC) and transmits the print job to a printing device. When printing is performed in the printing device, the user operates an operation panel of the printing device to provide an instruction according to a print mode to the printing device. As the printing device, a copier having a print function, a printer, multi-function peripherals (MFP), or the like is used.

For example, when a print operation according to the print job is performed in the MFP, the user inputs an instruction according to the print mode through the operation panel. The MFP processes the print job according to operation content of the user, which has been received through the operation panel. With the processing, the user can obtain a print result according to the print mode.

Technologies of processing a print job through a print server are disclosed in JP 2012-190440 A and JP 2011-238006 A, for example.

The print server in JP 2012-190400 A acquires information of a printer capable of performing printing from login information received from a client terminal, transmits the acquired information to the client terminal, and displays the information on the client terminal.

The print server in JP 2011-238006 A generates screen data for remotely operating an image forming apparatus in order to allow a remote terminal device to use the image forming apparatus, and provides the generated screen to the terminal device.

The print job has different content in print processing depending on the print mode. For example, when the print mode is authentication print, the MFP processes the print job after authenticating the user on the basis of information from the user. When the print mode is security print, the MFP processes the print job when receiving an ID (identifier) or a password from the user through an operation panel. When processing the print job of the authentication print or the security print through the print server, the user edits the print job while viewing the print job through a relatively large operation panel of the print server rather than a relatively small operation panel of the MFP, and transmits the print job after editing to the MFP. Next, the user moves to the MFP, and operates the operation panel of the MFP and inputs information such as an ID or a password to the MFP.

In this way, the user is required to perform an operation at the MFP after performing an operation on the print server, depending on the print mode of the print job. When the user operates two operation panels, a possibility of occurrence of a wrong operation becomes high. Further, when processing a next print job after printing, the user needs to come and go between the print server and the MFP, and thus the operation is complicated.

JP 2012-190400 A and JP 2011-238006 A do not disclose a configuration to handle the wrong operation or the complicated operation.

SUMMARY

Therefore, an object of an aspect of the present disclosure is to provide an image processing system and an image processing program.

To achieve the abovementioned object, according to an aspect of the present invention, an image processing system reflecting one aspect of the present invention comprises: an image processor having an image print function; and a server part, wherein the image processing system is connectable to a display part that displays a screen, and the server part determines whether acquisition of request information to be requested for printing is necessary, on the basis of a print mode of a print job, and generates a first screen for receiving a user operation for inputting the request information as the screen when the acquisition is necessary and generates a second screen different from the first screen when the acquisition is unnecessary.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a diagram illustrating an example of a Javascript program according to the first embodiment;

DETAILED DESCRIPTION OF EMBODIMENTS

Figure 1:
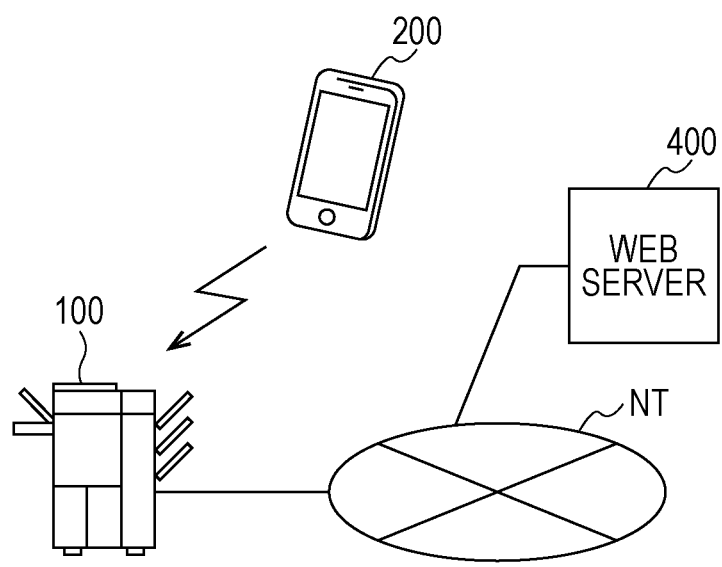
FIG. 1 is a diagram illustrating an example of a configuration of an image processing system according to a first embodiment.

Hereinafter, one or more embodiments of the present invention will be described with reference to the drawings. However, the scope of the invention is not limited to the disclosed embodiments. In the description below, the same

First Embodiment

Terms to be used in the embodiments will be described.

"print job" includes data indicating a print mode, print setting information, and print data. "print setting information" includes data of print forms (a margin, a space, paper feed, and the like), user identification information, print permission information, and the like. Data of the print mode is indicated by printer job language (PJL).

"user identification information" is referred to authenticate a user, and includes, for example, a user name, a user ID, and a bio information (fingerprint), and the like. The "user identification information" also corresponds to login permission information referred to permit login of the user to an MFP unit 10B (described below).

"print permission information" is information referred to unlock a print job and permit printing, and is here a password, for example. Further, the print permission information may include a key for decrypting encrypted data.

The "print mode" includes "authentication print" that requires various types of authentication processing and "public print" that does not require the authentication processing. The "authentication print" includes "security print" and "user authentication print". The "security print" requires user authentication by collation of the user identification information, and collation (password authentication) of a password for permitting printing. The "user authentication print" requires only the above-described user authentication. Authentication processing for the "security print" is an example of first authentication processing according to a first authentication method. Further, authentication processing for the "user authentication print" is an example of second authentication processing according to a second authentication method simpler than the first authentication method for the "security print".

"print data" includes data for identifying an image. The data for identifying an image is, for example, raster data, a file written in page description language (PDL), or the like. However, the data is not limited to these types of data.

Outline of Embodiment

In the embodiment, an image processing system (MFP 100) including an image processor (MFP unit 10B) having an image print function and a server part (server part 10A) is illustrated. The image processing system is connectable to a display part for displaying a screen. The server part 10A determines whether acquisition of request information requested for printing is necessary, on the basis of the print mode, and generates a first screen for receiving a user operation to input the request information, as a screen, when necessary, and generates a second screen different from the first screen when unnecessary. The request information includes login request information (user identification information) or print permission request information (a password and the like) described below.

Therefore, the server part determines whether information to be requested for printing on the basis of the print mode has been acquired on the display part shared by the image processor and the server part, and display a different screen on the basis of a result of the determination. The user can perform an input operation of the information required for printing by the image processor, on the screen of the server part without performing a switching operation of the screen of the image processor and the screen of the server part.

System Configuration

FIG. 1 is a diagram illustrating an example of a configuration of an image processing system according to a first embodiment. Referring to FIG. 1, the system includes multifunction peripherals (MFP) 100 communicatively connected to various networks NT such as the Internet, and a mobile terminal 200. Note that, here, the MFP 100 is, but is not limited to, an example of an "image processing system". For example, the MFP 100 may be a typical computer including an image processing function and an image output (print and display) function.

Configuration of MFP 100

Figure 2:
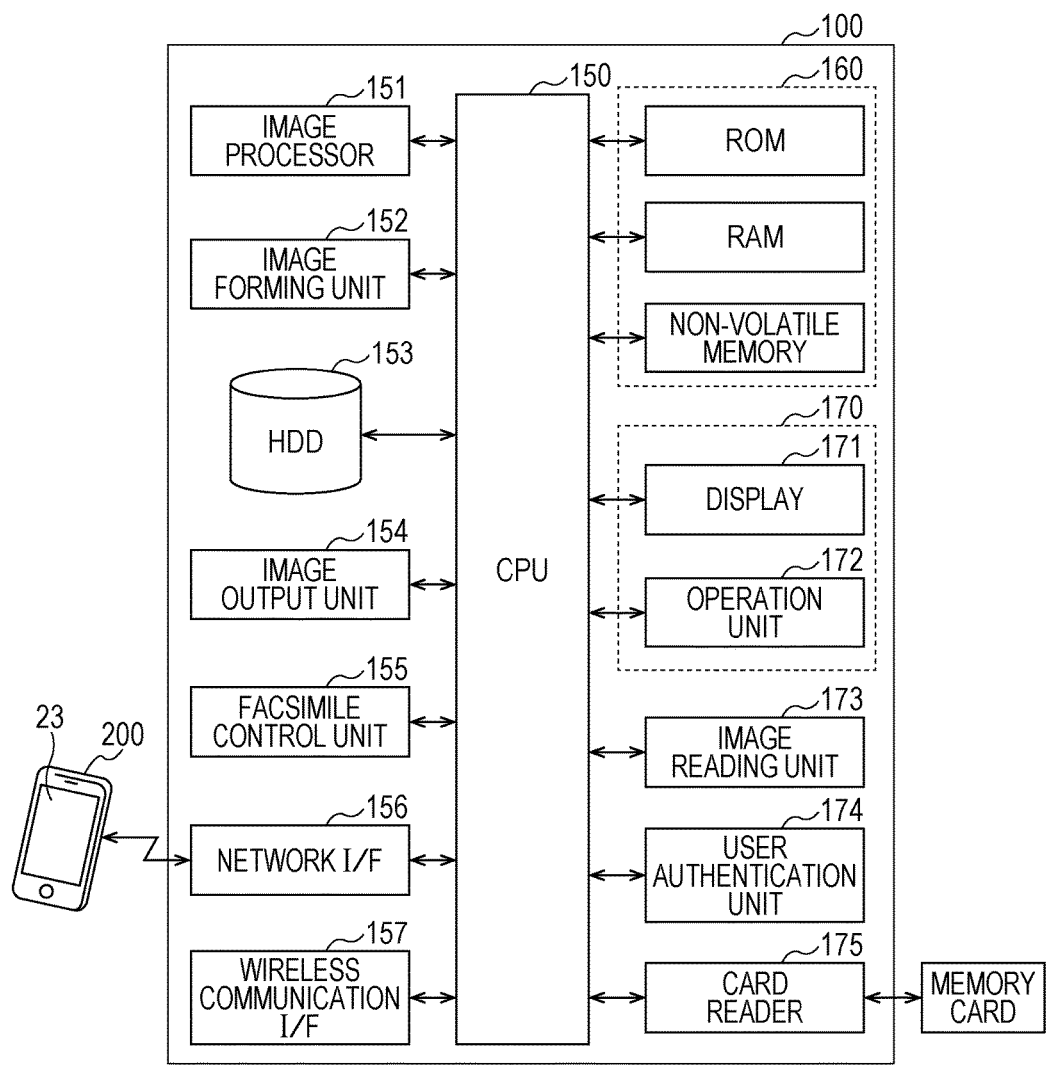
FIG. 2 is a diagram illustrating an example of a hardware configuration of an MFP according to the first embodiment.

FIG. 2 is a diagram illustrating an example of a hardware configuration of the MFP 100 according to the first embodiment. Referring to FIG. 2, the MFP 100 includes a central processing unit (CPU) 150 corresponding to a control unit for controlling the entire machine, a storage unit 160 for storing a program and data, an operation panel 170, a network interface (I/F) 156, a wireless communication interface (I/F) 157, a card reader 175, and various types of processors.

The storage unit 160 includes a read only memory (ROM), a random access memory (RAM), and a non-volatile memory, for storing a program executed by the CPU 150 and data. The RAM can also be used as a work area at the time of execution of the program.

The operation panel 170 includes a display 171 for outputting information and an operation unit 172. The display 171 and the operation unit 172 are integrally configured. The operation panel 170 receives an operation for inputting information to the MFP 100 by the user.

Note that a display destination of the information is not limited to the operation panel 170 as long as the panel can be used as a display part connectable with the MFP 100 by wired or wireless means, and may be a touch panel 24 (described below) of the mobile terminal 200.

The card reader 175 reads data stored in the memory card or writes data to the memory card. The data read/written from/to the memory card includes a program.

The network I/F 156 communicates various data including image data through the network NT. The wireless communication I/F 157 performs wireless communication with an external device such as the mobile terminal 200.

The various types of processors include an image processor 151, an image forming unit 152, a hard disk drive (HDD) 153 that stores various data, an image output unit 154, a facsimile control unit 155 for controlling a facsimile function, an image reading unit 173 for optically reading a document placed on a document table (not illustrated) to obtain image data, and an authentication unit 174.

The authentication unit 174 performs authentication processing by collation of user identification information for "user authentication print" and performs authentication processing by collation of a password for "security print". The authentication unit 174 collates collation information (the login request information (a user name and a user ID for identifying the user), a password for requesting unlock, or the like) input by the user at the time of login to the MFP unit 10B, and the user identification information (login permission information) of the print job and the print permission information, and outputs a collation result.

The image processor 151 has a function to process print data to become printable. The image output unit 154 includes a print unit that prints an image after processing by the image processor 151 to a sheet. A printing device of the MFP 100 includes at least the image processor 151 and the image output unit 154.

The storage unit 160 and the HDD 153 stores screen generation data for generating a screen to be displayed on the operation panel 170. Note that the screen generation data may be received from the web server 400.

<Configuration of Mobile Terminal 200>

Figure 3:
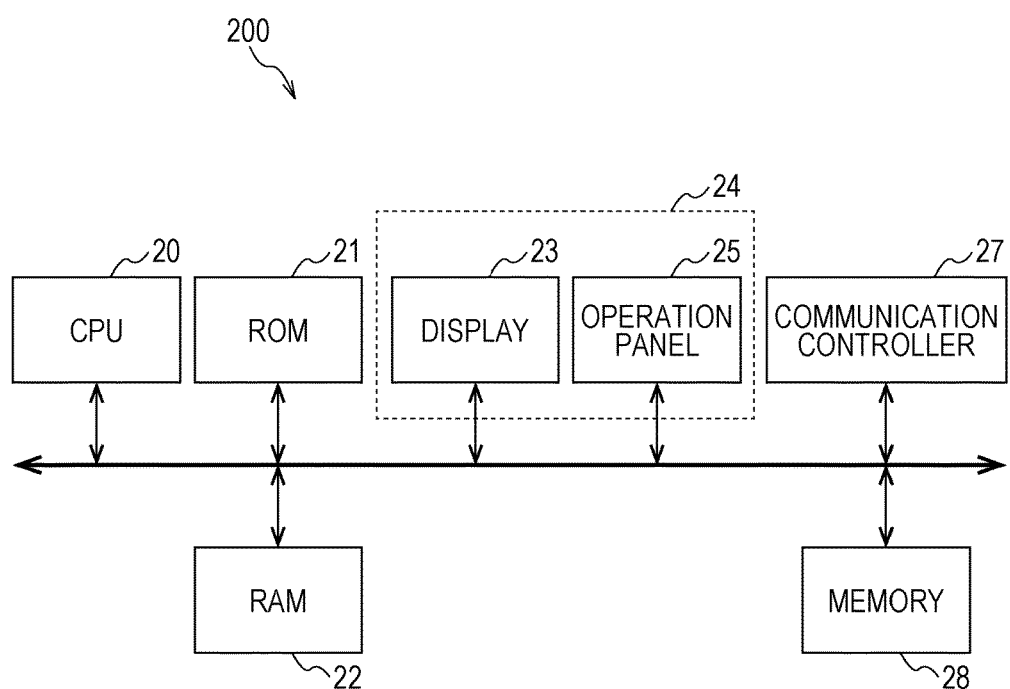
FIG. 3 is a diagram illustrating an example of a hardware configuration of a mobile terminal.

FIG. 3 is a diagram illustrating an example of a hardware configuration of the mobile terminal 200. The mobile terminal 200 corresponds to a mobile information processing terminal such as a smart phone. Referring to FIG. 3, the mobile terminal 200 includes a CPU 20 corresponding to a control unit for controlling the entire mobile terminal, a ROM 21 and a RAM 22 for storing a program and data executed by the CPU 20, a display 23 such as a liquid crystal display, an operation panel 25 operated by the user to input information to the mobile terminal 200, a communication controller 27 for controlling communication through the network NT, and a memory 28 including a hard disk device. Here, the display 23 and the operation panel 25 may be provided as a touch panel 24 in which the display and the operation panel are integrally configured. Further, the RAM 22 can be used as a work area when the program is executed by the CPU 20. Further, the mobile terminal 200 may include a wireless communication circuit (not illustrated). In that case, the mobile terminal 200 performs communication with the wireless communication I/F 157 of the MFP 100 through the wireless communication circuit.

<Outline of Flow of Print Job>

Figure 4:
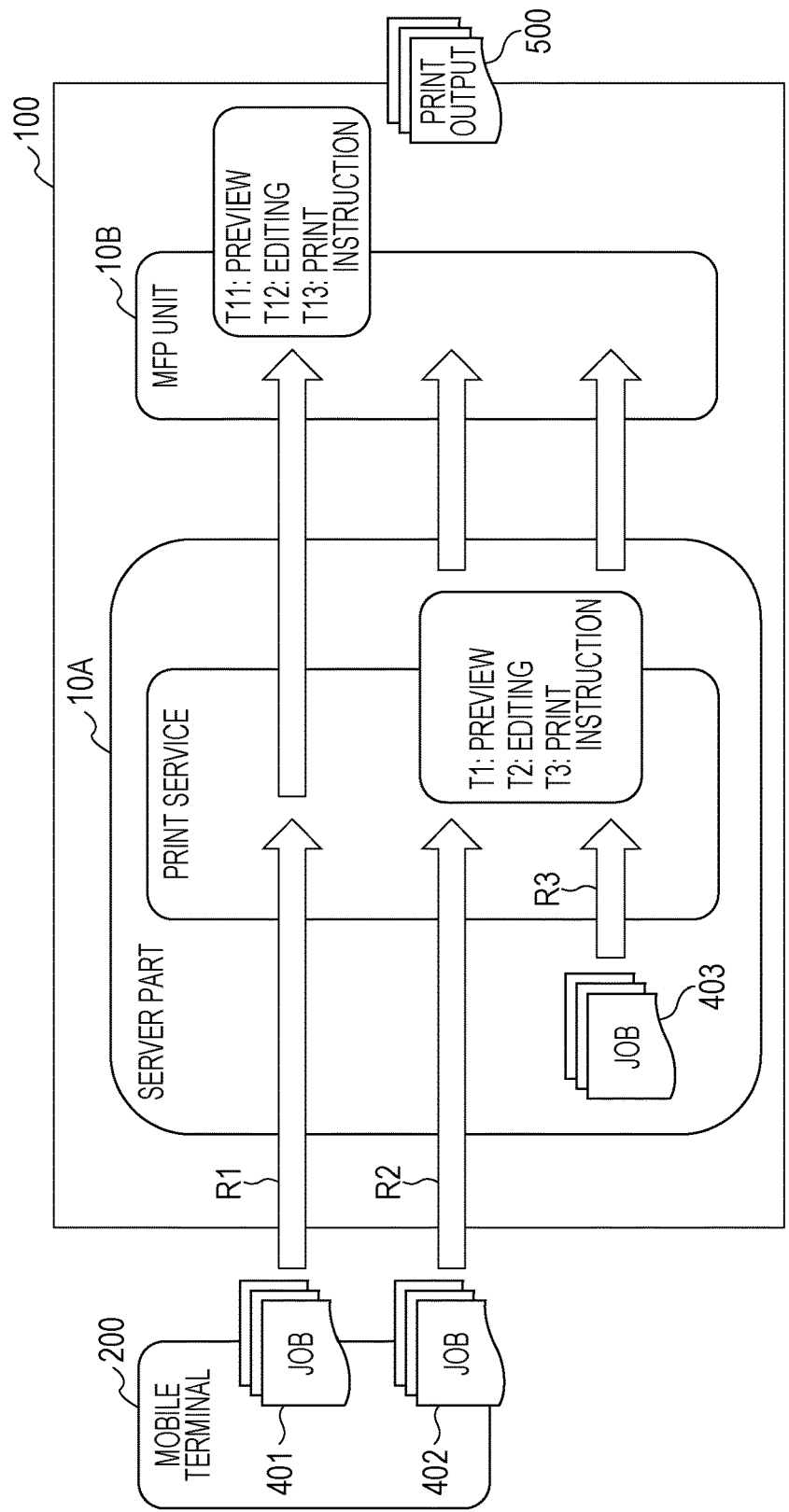
FIG. 4 is a diagram schematically illustrating a flow of processing of a print job according to the first embodiment of the present invention.

FIG. 4 is a diagram schematically illustrating a flow of processing of the print job according to the first embodiment of the present invention. FIG. 4 illustrates the flow of processing of the print job in association with functions of the MFP 100. Referring to FIG. 4, the MFP 100 includes a server part 10A corresponding to a print server function and an MFP unit 10B corresponding to an image processor function. The server part 10A and the MFP unit 10B include the program of the storage unit 160 or the HDD 153. When the CPU 150 reads the program from the storage unit 160 or the HDD 153 and executes the program, the functions of the respective units are realized.

The server part 10A has a print service function. The print service function executes processing of preview T1, editing T2, and print instruction T3 about the print job. The preview T1 is to display a list of print jobs or an image based on print data on the display 171 in printing. The editing T2 is to edit the print data or the print job according to operation content of the user, which has been received through the operation panel 170. The print instruction T3 is to generate an instruction (hereinafter, also referred to as print instruction) of print start according to operation content of the user, which has been received through the operation panel 170, and outputs the instruction.

Similarly, the MFP unit 10B includes preview T11, editing T12, and print instruction T13. The preview T11, the editing T12, and the print instruction T13 have functions respectively corresponding to the preview T1, the editing T2, and the print instruction T3 described above, and thus description is not repeated here.

Referring to FIG. 4, the MFP 100 processes the print job on the basis of the print mode of the print job according to any of routes R1, R2, and R3. In the first embodiment, the print job received by the MFP 100 includes the print job transmitted from the mobile terminal 200 and the print job generated in the server part 10A. The print mode of the print job can be variable specified. To be specific, the user sets the print mode to the print job when creating the print job on the mobile terminal 200 or when operating the operation panel 170 to generate the print job.

Referring to FIG. 4, the route R1 is a case in which the print mode is 'public print'. In the route R1, the server part 10A causes a print job 401 received from the mobile terminal 200 to go through the path of the print service unit and outputs the print job 401 to the MFP unit 10B. The MFP unit 10B performs the preview T11, the editing T12, and the print instruction T13, for the print job 401, according to the user operation content received through the screen of the operation panel 170, to acquire a print output 500.

Further, the routes R2 and R3 are cases where the print mode is 'authentication print'. In the route R2, the server part 10A receives a print job 402 from the mobile terminal 200. The print service unit performs the preview T1, the editing T2, and the print instruction T3, for the print job 402, according to the user operation content received through the screen of the operation panel 170, and outputs a result to the MFP unit 10B. In the MFP unit 10B, the printing device acquires the print output 500 based on the print job 402.

Further, in the route R3, the server part 10A receives a print job 403 generated according to the user operation content through the operation panel 170. The print service unit performs the preview T1, the editing T2, and the print instruction T3, for the print job 403, according to the user operation content received through the screen of the operation panel 170, and outputs a result to the MFP unit 10B. In the MFP unit 10B, the printing device receives the print output 500 based on the print job 402.

In this way, the server part 10A processes the print jobs according to the different routes according to the print modes. In the routes R1 to R3, user interface (UI) screens displayed on the operation panel 170 are different. The user can confirm by which route the print job is being processed because the displayed UI screen is different.

<Reception of Print Job>

Figure 5:
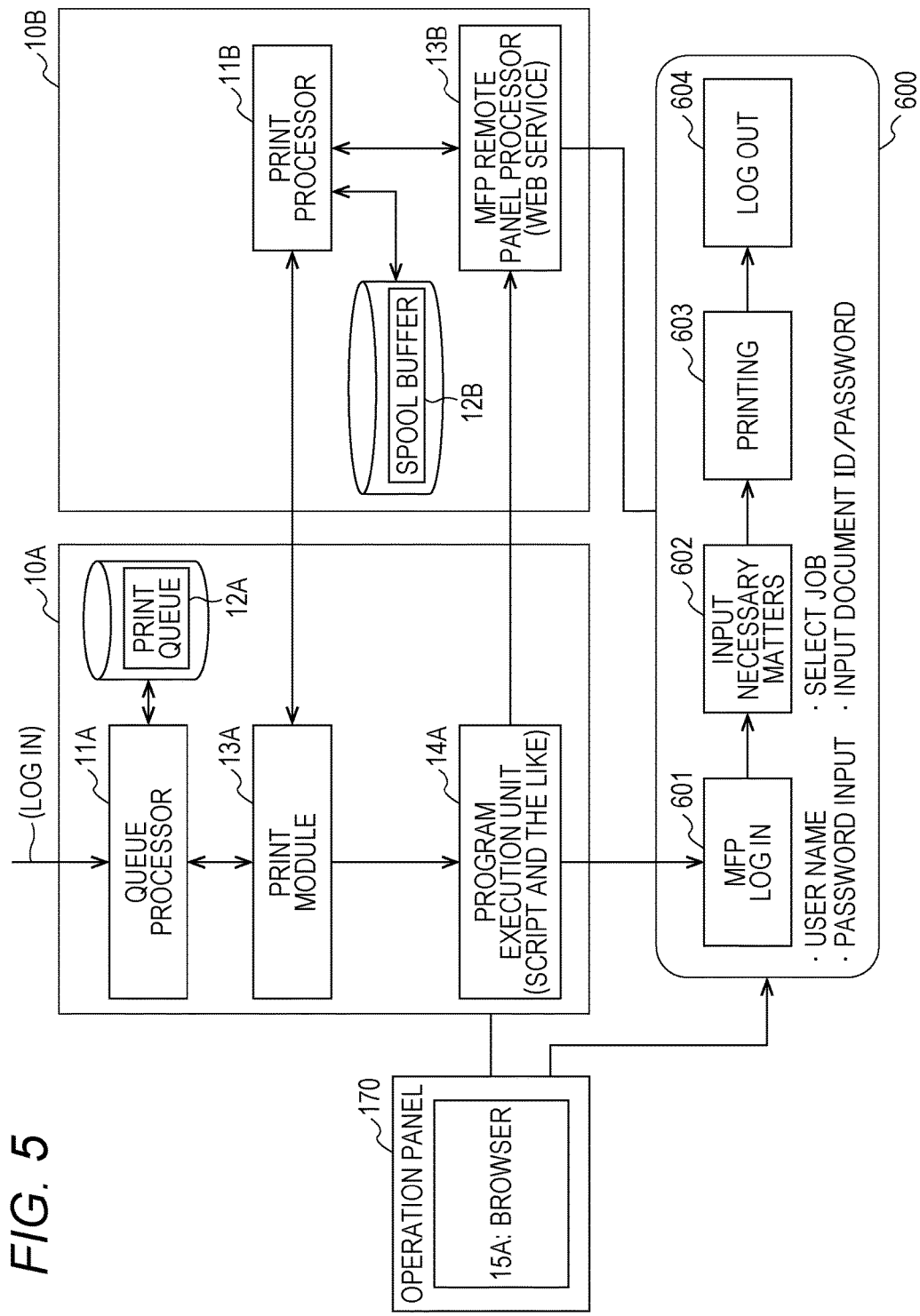
FIG. 5 is a diagram schematically illustrating exchange of data between a server part and an MFP unit according to the first embodiment of the present invention.

FIG. 5 is a diagram schematically illustrating exchange of data between the server part 10A and the MFP unit 10B according to the first embodiment of the present invention. The server part 10A includes a queue processor 11A, a print module 13A, a program execution unit 14A, and a browser 15A for displaying information on the operation panel 170.

The print queue 12A includes a storage unit 153 and stores the print job. The queue processor 11A stores the print job to the print queue 12A or reads the print job from the print queue 12A. The print module 13A transmits the print job received from the queue processor 11A to the MFP unit 10B. The program execution unit 14A generates, through the browser 15A, a UI screen for automating a user operation and an input for executing the print processing, and outputs the UI screen to the operation panel 170.

The MFP unit 10B includes a print processor 11B that executes the print processing based on the print job by controlling the printing device, a spool buffer 12B that stores the print job, and an MFP remote panel processor 13B. The MFP remote panel processor 13B reads the screen generation data from the storage unit 160 or the HDD 153. Alternatively, the MFP remote panel processor 13B receives the screen generation data from the web server 400. The MFP unit 10B transmits the screen generation data to the server part 10A. Note that the MFP unit 10B can generate a screen according to the screen generation data and display the screen on the operation panel 170.

<Specific Content of Flow of Print Job>

A specific flow of the processing of the print job will be described with reference to FIG. 5. Here, one or more print jobs are stored in the print queue 12A. First, the server part 10A collates the login request information to the MFP 100 (more specifically, to the server part 10A) received from the user with registration information of the storage unit 160, and permits login of the user to the MFP 100 when determining that authentication has succeeded on the basis of a collation result. The login request information includes a user name, a user ID, and the like. The server part 10A receives the login request information from the mobile terminal 200, or receives the login request information from the user operation content through the operation panel 170.

When the login of the user is permitted, the queue processor 11A reads the print jobs in the print queue 12A and displays the print jobs as a list on the operation panel 170. The print module 13A selects one or more print jobs from the list according to the user operation content, and outputs the selected print job to the MFP unit 10B. At this time, when the selected jobs are edited, the print module 13A outputs the print job after editing to the MFP unit 10B.

The print processor 11B of the MFP unit 10B stores the print job received from the server part 10A to the spool buffer 12B. When the print job is stored in the spool buffer 12B, the print processing becomes executable. The print processor 11B outputs storage completion of the print job to the spool buffer 12B to the server part 10A as spool notification.

The print module 13A determines that the print job is executable on the basis of the spool notification from the MFP unit 10B, and starts the program execution unit 14A on the basis of the determination. At this time, the print module 13A outputs the user identification information (the above-described login request information) of the user who has logged in to the program execution unit 14A.

The program execution unit 14A starts the MFP remote panel processor 13B. The MFP remote panel processor 13B has a remote panel function (interface) to receive operation content for operating the MFP 100 from a remote (distant) place. The server part 10A can emulate the remote panel function of the MFP 100 through the browser 15A, for example. A script program of the server part 10A is a program for enabling automatic execution of the remote panel function. This script program includes information of screen transition (a screen flow) that is different according to the print mode.

When the MFP remote panel processor 13B is started, the MFP remote panel processor 13B reads screen operation data for the operation panel of the MFP 100 (more specifically, of the MFP unit 10B) from the storage unit 160 or the HDD 153, and outputs the screen operation data to the server part 10A. Note that the screen generation data may be received from the web server 400. The program execution unit 14A generates a screen through the browser 15A, using the screen data from the MFP remote panel processor 13B, and displays the screen on the operation panel 170.

The program execution unit 14A executes a program for an automatic operation and an automatic input, which does not require a user operation and an input for the print processing, using the user identification information as an argument of the program. The program is described in Java (registered trademark) script language. However, the program language is not limited thereto. With the execution of the program, parameters for executing the print processing are set to the screen. The parameters include, for example, the user identification information and print setting information including the print mode.

With the execution of the program, the server part 10A performs user authentication or password authentication.

When the authentication has succeeded, the server part 10A transmits a print instruction to the MFP unit 10B. When the print processor 11B receives the print instruction, the print processor 11B controls the printing device to perform the print processing according to the print job in the spool buffer 12B, and acquires the print output 500.

(Screen Transition)

When the script program is executed by the program execution unit 14A, the screen generated through the browser 15A is switched as illustrated in transition 600 in FIG. 5. In the transition 600, first, a screen 601 for prompting the user to log in to the MFP 100 (more specifically, to the server part 10A) is generated. The program execution unit 14A sets the user identification information and the like to the screen 601.

After that, a screen 602 is generated. The program execution unit 14A sets a print form of the print setting information, selection of the print job, a document ID, and the like to the screen 602. After that, a screen 603 is generated. The screen 603 is a screen for informing the fact that the print processing is in execution in the MFP unit 10B. When execution of the print processing is terminated, a screen 604 is generated. The screen 604 is a screen for informing logout of the user from the MFP 100 (more specifically, from the server part 10A).

In the first embodiment, the series of screens in the transition 600 can be generated, and switched and displayed on the operation panel 170. These screens are screens for the automatic operation and the automatic input, and thus generation of the screens and embedding (setting) of information on the screens may be performed as background processing without displaying the screens on the operation panel 170. In the first embodiment, the background processing is executed. Switching of the displayed screen is not performed by the background processing. With the processing, flicker in screen on the operation panel 170 due to screen switching can be prevented.

FIG. 6 is a diagram illustrating an example of the program in Javascript according to the first embodiment. Referring to FIG. 6, the script program includes, for the automatic operation and the automatic input, a command to receive the user name (user identification information), a command to receive a password, and a command to receive an operation of the print instruction (pressing of a button). These commands are executed using the above-described parameters.

<Specific Example of Screen Transition>

Figure 7:
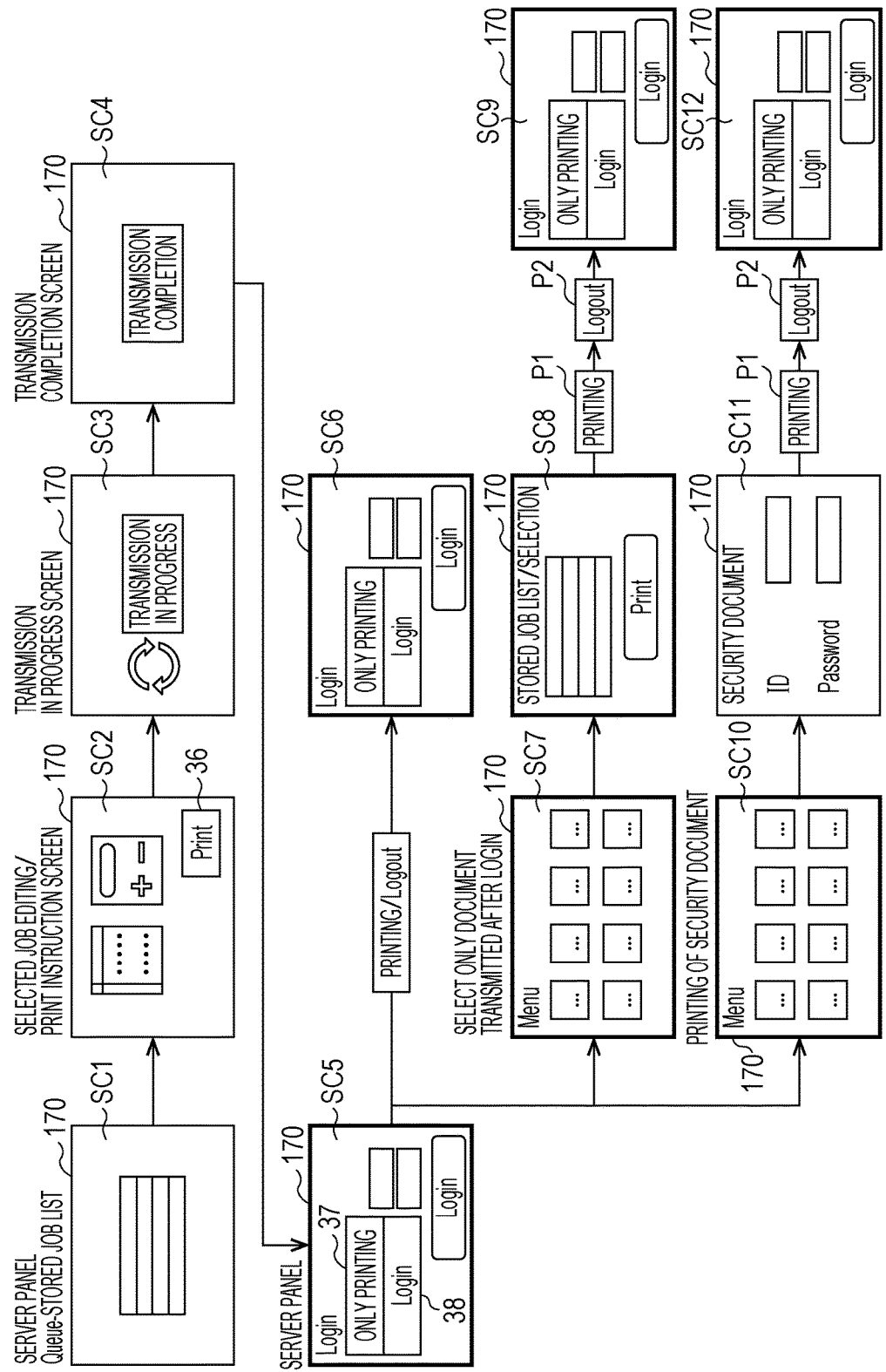
FIG. 7 is a diagram illustrating a specific example of screen transition according to the first embodiment.

FIG. 7 is a diagram illustrating a specific example of the screen transition according to the first embodiment. Referring to FIG. 7, transition of screens generated from when the user logs in to when execution of the print processing is terminated will be described. Screens SC1 to SC12 in FIG. 7 can be generated on the basis of the screen generation data for the print processing from the MFP unit 10B under control of the server part 10A, and displayed on the operation panel 170. Therefore, the user may not perform a switching operation of the screen of server part 10A→the screen of the MFP unit 10B.

In the first embodiment, the screens SC5 to SC10 and SC12 surrounded by the thick frames, of the screens SC1 to SC12, can be undisplayed on the operation panel 170 by the above-described background processing.

First, when the user inputs the login request information including the user name, the user ID, and the like in order to log in to the MFP 100 (more specifically, to the server part 10A), and the login is permitted, the operation panel 170 displays the screen SC1. The screen SC1 includes a list of identifiers of the print jobs stored in the print queue 12A.

When the user selects one or more print jobs from the list, the screen SC2 is displayed. The screen SC2 includes a button 36. The screen SC2 is a screen that receives editing and a print instruction (an operation to the button 36) of the selected print job. When the button 36 is operated, the screen SC3 is displayed. The screen SC3 informs transmission (in transmission) of the print job selected by the user from the server part 10A to the MFP unit 10B. When transmission of the print job is completed, the screen SC4 that informs transmission completion is displayed.

The print module 13A receives the spool notification from the MFP unit 10B. Further, the print module 13A outputs the above-described various parameters to the program execution unit 14A.

The program execution unit 14A generates the screen SC5 through the browser 15A. The screen SC5 receives two types of instructions including an instruction 37 of "only printing" and an instruction 38 of "log in". The program execution unit 14A sets either the instruction 37 or 38 to ON on the basis of data of the print mode of the print job. To be specific, the instruction 37 is set when the print mode indicates the 'public print', and the instruction 38 is set when the print mode indicates the 'authentication print'.

(When Instruction 37 of "Only Printing" is Set)

When the instruction 37 of "only printing" is set, the program execution unit 14A determines that the print setting information (especially, the user identification information and the password) for the print processing is not necessary on the basis of the print mode ('public print') (corresponding to the route R1). In this case, the print module 13A outputs the print instruction without performing the above-described authentication processing. When the print processor 11B of the MFP unit 10B receives the print start instruction, the print processor 11B executes the print processing for the print job in the spool buffer 12B, and outputs the print output 500. After that, the server part 10A executes logout processing for the user from the MFP 100, and the browser 15A switches the screen to the screen SC6 for receiving the instruction 37 or 38.

(When Instruction 38 of "Log In" is Set)

When the instruction 38 of "log in" is set (the route R2 or R3), the program execution unit 14A determines that the print setting information (especially, the user identification information and the password) for starting the print processing is necessary on the basis of the print mode. The program execution unit 14A permits login of the user to the MFP unit 10B, by the authentication processing using the print setting information. In this authentication processing, the program execution unit 14A collates the user identification information (corresponding to the login permission information) received from the parameters, and the login request information (the user name, the user ID, and the like) received from the operation content of when the user has requested login to the MFP 100 (more specifically, to the server part 10A). When both pieces of the information are matched through the collation, the login of the user to the MFP unit 10B is permitted.

When the instruction 38 is set, the print form is the 'authentication print', and thus next, the program execution unit 14A determines whether the print mode of the selected print job indicates either the 'user authentication print' or the 'security print'.

When the program execution unit 14A determines that the print mode is the 'user authentication print', the program execution unit 14A executes the program on the basis of the parameters, and performs the transition of the screens SC7 to SC9 through the browser 15A. Further, when the program execution unit 14A determines that the print mode is the 'security print', the program execution unit 14A excites the program on the basis of the parameters, and performs the transition of the screens SC10 to SC12 through the browser 15A.

<Screen Transition of User Authentication Print>

The program execution unit 14A generates the screen SC7 that displays a list of items of print forms according to the 'user authentication print' by the browser 15A. The program execution unit 14A sets an item specified in the print form of the print job, of the items in the list on the screen SC7. Next, the screen SC7 is switched to the screen SC8 that displays a list of identifiers of the print jobs by the browser 15A. The program execution unit 14A specifies the identifier of the print job transmitted on the screen SC3 from the list on the screen SC8. The specified identifier of the print job is transmitted to the MFP unit 10B in association with specification information of the print form set on the screen SC7. At this time, the print instruction is also transmitted.

The remote panel processor 13B of the MFP unit 10B outputs, to the print processor 11B, the information (the identifier of the print job, the specification information of the print form, and the print instruction) received from the server part 10A. When the print processor 11B determines that the identifier of the print job stored in the spool buffer 12B, and the identifier of the print job received from the server part 10A are matched, the print processor 11B causes the printing device to start print processing P1 in accordance with the print job according to the print instruction. With the processing, the print output 500 according to the print form is acquired.

When the server part 10A receives notification of execution termination of the print processing P1 from the print processor 11B, the program execution unit 14A executes logout processing P2 for the user from the MFP unit 10B, and switches the screen to the screen SC9 (that is the same as the original SC6) for logging in to the MFP unit 10B, through the browser 15A. With the processing, start of the processing by the program execution unit 14A based on the parameters, for the next selected print job, becomes available.

<Screen Transition of Security Print>

The program execution unit 14A generates the screen SC10 that displays an item list of the print form according to the 'security print'. The program execution unit 14A sets an item specified by the print form of the print job selected and output to the MFP unit 10B, of the items in the list on the screen SC10. Next, the browser 15A generates the screen SC11 for receiving an input operation of the password and displays the screen SC11 on the operation panel 170.

When the screen SC11 is displayed, the user operates the operation panel 170 to input the user ID and the password. The program execution unit 14A acquires the user ID and the password from the user operation content received through the operation panel 170.

The program execution unit 14A collates the acquired user ID and password, and the parameters (the user identification information of the print job (corresponding to the login permission information) and the password). When the result of the collation indicates matching, the program execution unit 14A unlocks the print job. That is, the program execution unit 14A outputs the print instruction to the MFP unit 10B in association with the specification information of the print form set on the screen SC10.

The remote panel processor 13B of the MFP unit 10B outputs, to the print processor 11B, the specification information of the print form set on the screen SC10 and the print instruction. The print processor 11B causes the printing device to start the print processing P1 for the print job stored in the spool buffer 12B according to the print instruction. With the processing, the print output 500 according to the print form is acquired.

When the server part 10A receives notification of execution termination of the print processing P1 from the print processor 11B, the program execution unit 14A executes the logout processing P2 for causing the user to log out from the MFP unit 10B, and then switches the screen to the screen SC12 (that is the same as the original screen SC6) for performing the print processing for the next print job, through the browser 15A. With the processing, start of the print processing for the next print job becomes available.

According to FIG. 7, whether the information (the login request information or an unlock request information password) required for printing is necessary is determined on the basis of the print mode of the print job, and a first screen (a screen of the screens SC7 to SC12) for receiving the user operation to input the request information is generated as the screen when necessary, and a second screen (the screen SC6) different from the first screen is generated when unnecessary.

Further, the server part 10A generates an operation reception screen (the screen SC5, SC8, or SC11) that receives the user operation to input collation information to be collated with the authentication information (the user identification information and the password) for the authentication processing, as the first screen.

The server part 10A executes first authentication processing for security print, using a plurality of pieces of the collation information (the login request information to the MFP unit 10B and the password for requesting unlock). Further, the server part 10A executes second authentication processing for the user authentication print, using one of the plurality of pieces of collation information (the login request information to the MFP unit 10B).

The plurality of pieces of collation information for the first authentication processing includes the login request information for requesting, by the user, the image processor to permit login, and the print permission request information (password) for requesting, by the user, the image processor to give print permission (unlock). Especially, the one piece of collation information to be input by the user for the second authentication processing is the login request information.

Modification

In FIG. 7, the input operation of the login request information to the MFP unit 10B has been required (see the screen SC5). However, this screen may not be displayed as needed. To be specific, the authentication information included in the print job includes the login permission information to be referred to permit login of the user to the MFP unit 10B. The server part 10A determines that the input of the login request information to the MFP unit 10B is not necessary when the login request information received when the user has logged in to the server part 10A is matched with the login permission information of the print job. The program execution unit 14A may not display the screen (the screen SC5 in the user authentication print) for receiving the input operation of the login request to the MFP unit 10B, on the basis of the determination.

<Comparison of Screen Transition>

Figure 8:
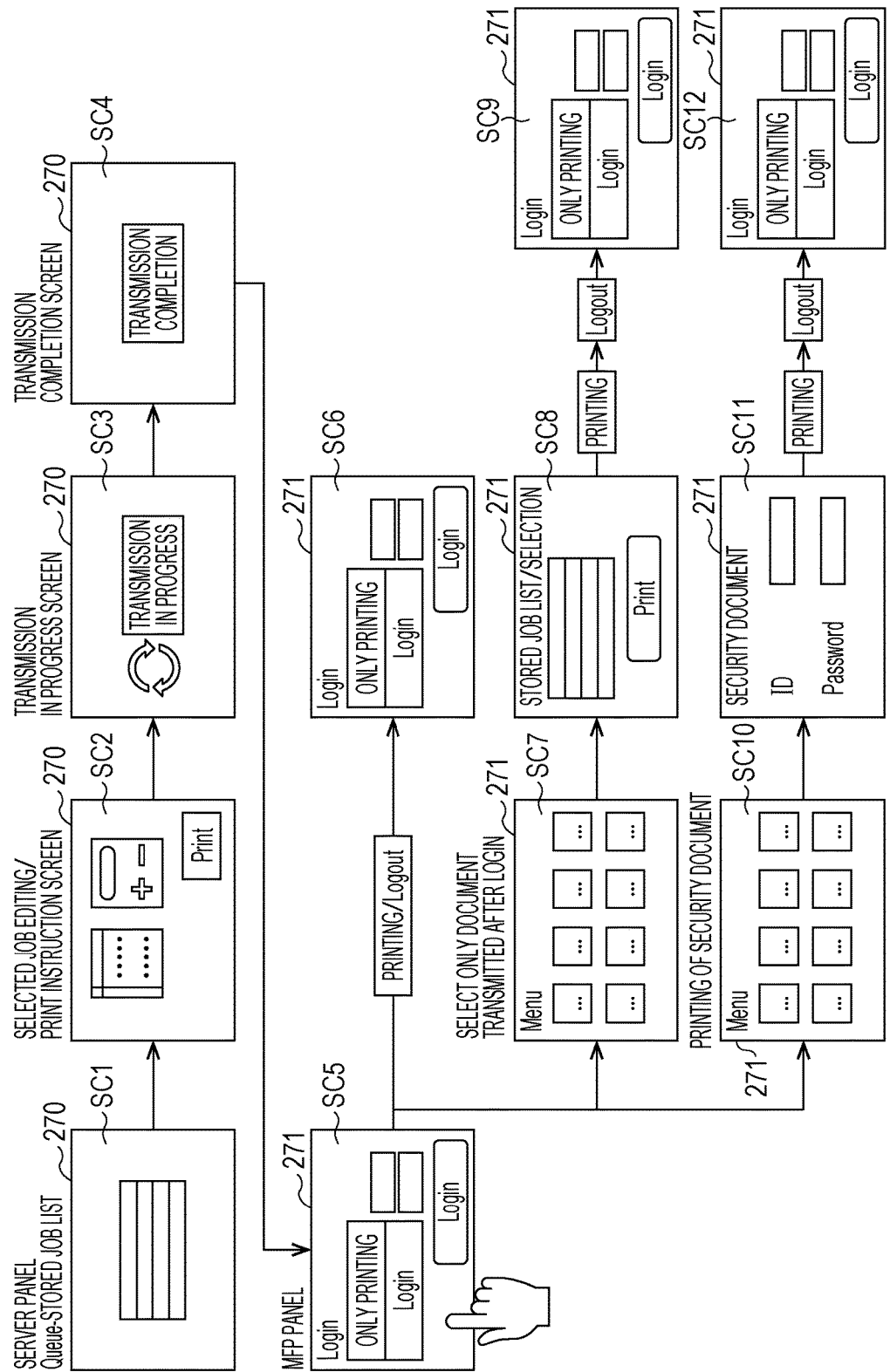
FIG. 8 is a diagram illustrating conventional screen transition for comparison.

FIG. 8 is a diagram illustrating conventional screen transition for comparison. In FIG. 8, for simple description, a print server and an MFP are independently arranged, and include different operation panels, respectively. Here, the operation panels of the print server and the MFP for description are illustrated as operation panels 270 and 271, respectively.

In FIG. 8, screens SC1 to SC4 are generated by the print server and are displayed on the operation panel 270 of the print server, unlike FIG. 7. A user moves to the MFP after confirming display of the screen SC4, and manually inputs an instruction for print processing through a screen displayed on the operation panel 271 of the MFP, of screens SC5 to SC12 displayed in the MFP.

According to FIG. 8, flows of the screens are different depending on print modes, and thus information to be input on the screens need to be different. Therefore, a wrong operation is more likely to occur, and the user feels that the operation is complicated. As a result, operability is not good. In contrast, in the screen transition by the first embodiment illustrated in FIG. 7, all the settings are available on the UI screen generated by the server part 10A and the user does not need to move. In addition, a part of the settings is realized by the automatic input and the automatic operation by the program execution unit 14A. Therefore, the operability for the user is improved, and the wrong operation can be prevented.

<Processing Flow>

Figure 9:
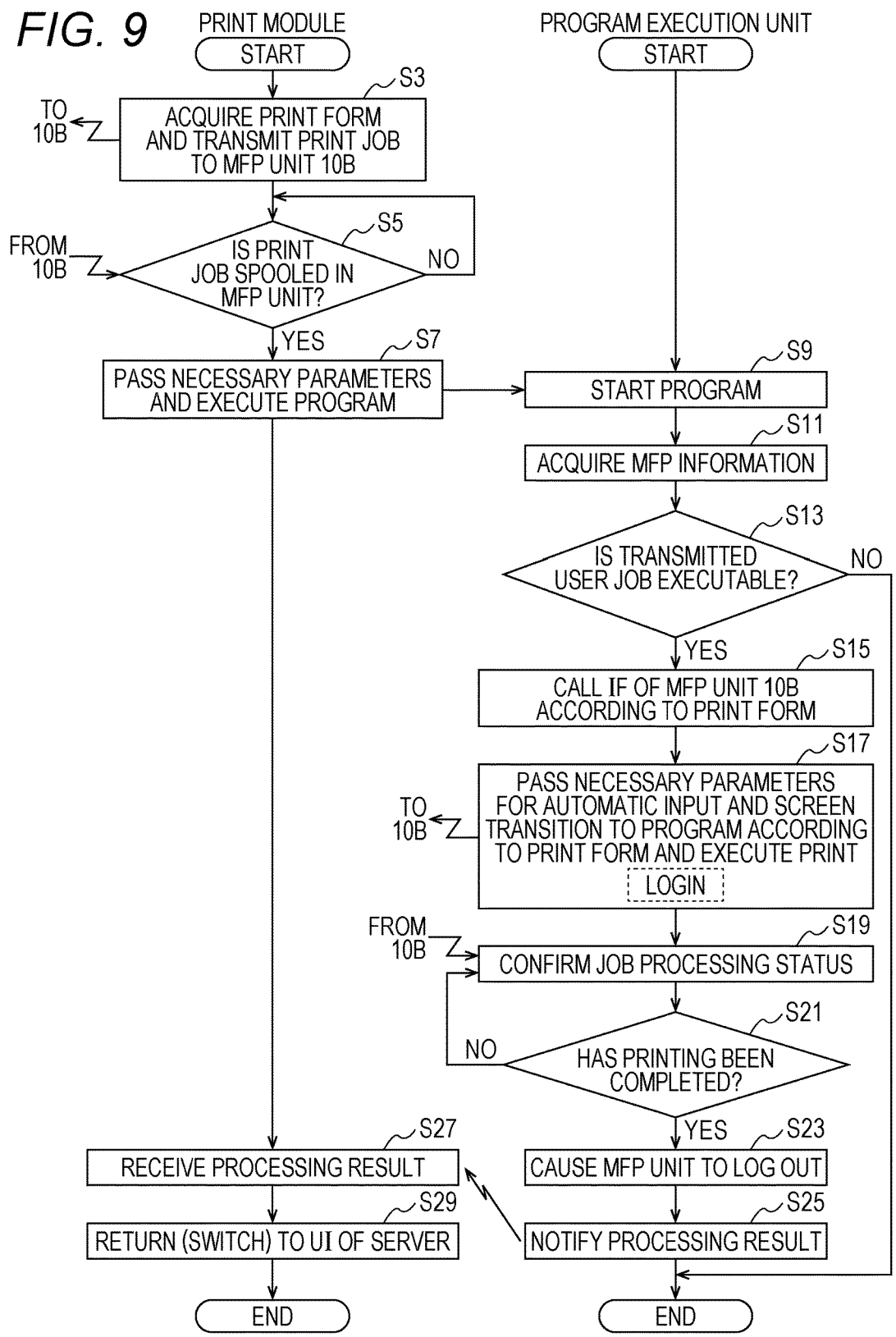
FIG. 9 is a processing flowchart according to the first embodiment.

FIG. 9 is a processing flowchart according to the first embodiment. In the first embodiment, the print module 13A acquires the print mode from the print job selected by the user on the screen SC1, and transmits the print job to the MFP unit 10B (step S3).

The print module 13A determines whether receiving the spool notification from the MFP unit 10B (step S5). When not receiving the spool notification (NO in step S5), the print module 13A performs determination of step S5. When receiving the spool notification (YES in step S5), the print module 13A passes parameters for the script program to the program execution unit 14A to start the program execution unit 14A (step S7). The parameters include information of screen transition according to the print mode, authentication information (a user name, an ID, and a password), and job information of the transmitted print job (such as an identifier of the print job).

The program execution unit 14A starts execution of the script program when started (step S9).

The program execution unit 14A acquires information of the MFP unit 10B (step S11). The MFP unit 10B transmits, to the program execution unit 14A, I/F information for remotely accessing the MFP unit 10B (for example, a uniform resource locator (URL) for the browser 15A or the screen generation data for generating a screen to transition.

The program execution unit 14A determines whether the transmitted print job is executable (step S13). For example, the program execution unit 14A determines whether the print job is executable from status information of the job received from the print processor 11B.

The status information indicates whether another print data other than the print data transmitted to the MFP unit 10B in step S3 is accumulated in the spool buffer 12B (or the another has not yet been printed), or whether the print processing is in execution for the another print data. When the another print data is accumulated (for the print processing for the another print data is in execution), the program execution unit 14A determines that the print job is not executable (NO in step S13). Further, the determination criterion as to whether the print job is executable is not limited to the status information. For example, whether the print job is executable may be determined on the basis of whether a user different from the user of the print job of the print data transmitted by the MFP unit 10B in step S3 has logged in to the MFP unit 10B. For example, the program execution unit 14A determines that the print job is not executable when it takes time to execute the print processing for the print data transmitted in step S3 by the MFP unit 10B, and the user has logged out and another user has logged in (NO in step S13).

When the program execution unit 14A determines that the print job is executable (YES in step S13), the program execution unit 14A calls the interface (I/F) of the MFP unit 10B according to the print mode of the print job transmitted in step S3 (step S15). To be specific, the program execution unit 14A acquires the screen generation data indicating a pattern of screen transition (MFP-side operation pattern) from the MFP unit 10B. The MFP remote panel processor 13B transmits the screen generation data received from the web server 400 to the program execution unit 14A. Alternatively, the MFP remote panel processor 13B executes a predetermined program (for example, page scope web connection: PSWC) to acquire the screen generation data. Note that the program execution unit 14A may appropriately change pattern information of the screen transition indicated by the acquired screen generation data according to the print mode.

The program execution unit 14A executes the script program (step S17). The program execution unit 14A passes parameters according to the print mode to the script program as arguments. The parameters include the pattern information of the screen transition described above. The screen transition (see FIG. 7) for an automatic input and an automatic operation as described above is performed by the script program. In the process of the automatic input, the server part 10A causes the user to log in to the MFP unit 10B (see the screen SC5).

When the automatic input and the automatic screen transition cannot be performed or when an error screen occurs in the automatic input and the automatic screen transition, a screen is displayed by foreground on the operation panel 170 and prompts the user to input necessary information.

In the automatic screen transition, the program execution unit 14A transmits the print instruction to the MFP unit 10B. The program execution unit 14A confirms a processing status of the print job from the MFP unit 10B (step S19). To be specific, the program execution unit 14A determines whether receiving notification of execution termination of the print processing from the MFP unit 10B. When the program execution unit 14A determines not to receive the notification of termination (NO in step S21), the program execution unit 14A causes the processing to return to step S19.

Meanwhile, when receiving the notification of execution termination of the print processing (YES in step S21), the program execution unit 14A causes the user to log out from the MFP unit 10B (see the logout processing P2 in FIG. 7).

The program execution unit 14A notifies the print module 13A of the processing result (the execution termination of the print processing and logout completion of the user) (step S25).

When receiving the notification of the processing result from the program execution unit 14A (step S27), the print module 13A passes through the screen transition, and displays an initial screen for UI of the server part 10A on the operation panel 170 (not illustrated) (step S29).

(Modification of Processing Flow)

A modification of the processing flow will be described. In step S3 described above, the print job may be cancelled when it is determined that the print processing takes time because the MFP unit 10B is executing a large volume of print processing, or the like when the print data is transmitted from the server part 10A to the MFP unit 10B.

Further, the print module 13A adds information with high priority to the print data and outputs the print data when the print job has high priority in print processing. When the print data received from the server part 10A includes information with high priority, the MFP unit 10B may start the print processing for the print data prior to other print data.

Second Embodiment

Figure 10:
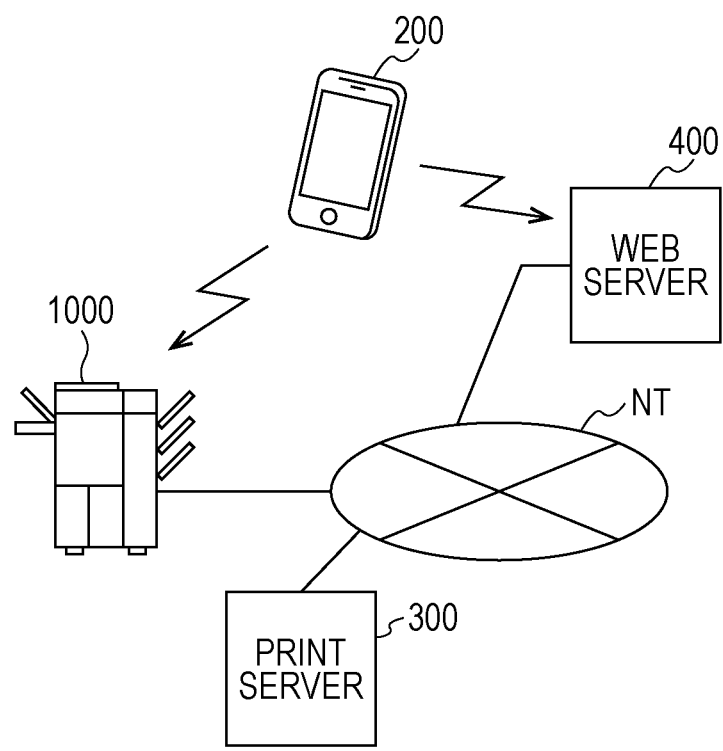
FIG. 10 is a schematic configuration diagram of an image processing system according to a second embodiment.
Figure 11:
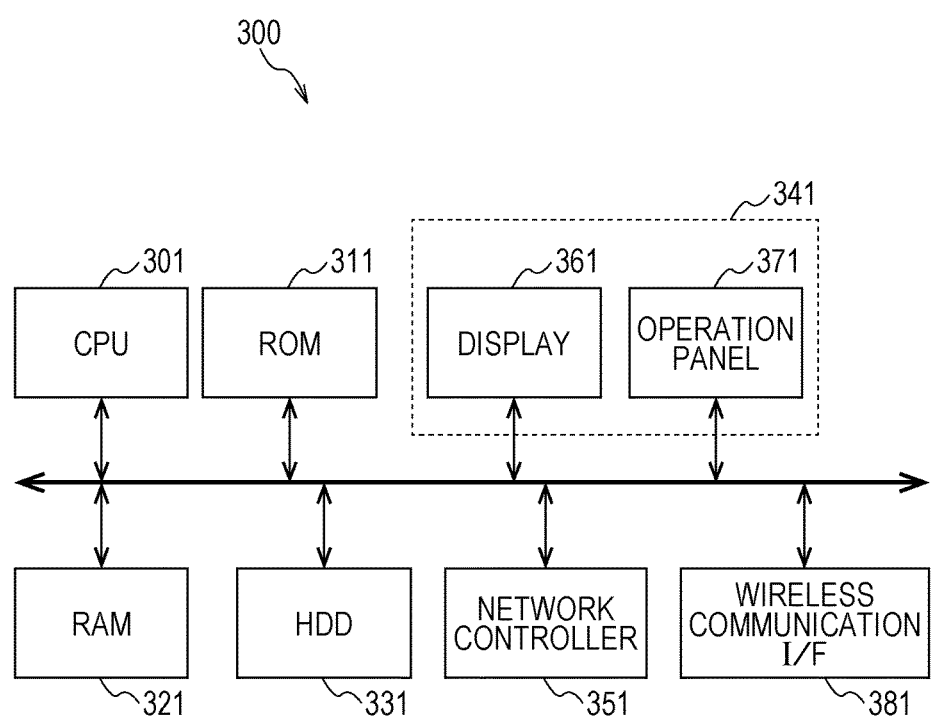
FIG. 11 is a configuration diagram of a print server according to the second embodiment.

A second embodiment illustrates a modification of the first embodiment. Although, in the first embodiment, the server part 10A and the MFP unit 10B are built in the MFP 100, the server part 10A and the MFP unit 10B may be independent of each other. FIG. 10 is a schematic configuration diagram of an image processing system according to the second embodiment. FIG. 11 is a configuration diagram of a print server 300 according to the second embodiment.

Referring to FIG. 10, the image processing system according to the second embodiment includes an MFP 1000 communicatively connected with a network NT, a web server 400, a print server 300, and a mobile terminal 200. Referring to FIG. 11, the print server 300 includes a CPU 301 corresponding to a control unit for controlling the entire server, a ROM 311 and a RAM 321 for storing programs and data executed by the CPU 301, a hard disk device (HDD) 331, a display 361 such as a liquid crystal display, an operation panel 371 operated by a user to input information, a network controller 351 for controlling communication through the network NT, and a wireless communication I/F 381. Here, the display 361 and the operation panel 371 may be provided as a touch panel 341 in which the display and the operation panel are integrally configured.

In the second embodiment, the MFP 1000 is an example of a device that executes print processing, and has the functions of the MFP unit 10B of the first embodiment. The print server 300 has the functions of the server part 10A of the first embodiment. In this way, the server part 10A and the MFP unit 10B are separately provided and perform communication with each other through the network NT, whereby screen transition illustrated in FIG. 7, similar to the first embodiment, can be realized on the operation panel of the print server 300.

Third Embodiment

In a third embodiment, a program for causing a computer to execute the two methods of the first and second embodiments is provided.

In the third embodiment, a program for causing a computer (an MFP 100, a print server 300, or the like) to execute processing of screen transition illustrated in FIG. 7 above is provided. Such a program can be provided as a program product by being recorded on a computer-readable recording medium such as a flexible disk attached to the computer, a compact disk-read only memory (CR-ROM), a ROM, a RAM, or a memory card. Further, the program can be provided by being recorded on a recording medium such as a hard disk built in the computer. Alternatively, the program can be provided by being downloaded through a network.

Note that the program may call necessary modules, of program modules provided as a part of an operating system (OS) of the computer, by a predetermined array at predetermined timing, and cause the modules to execute the processing. In that case, the program itself does not include the modules and executes the processing in cooperation with the OS. The program not including the modules can also be included in the program of the second embodiment.

Further, the program according to the third embodiment may be provided by being incorporated in a part of another program. In that case, the program itself does not include modules included in the other program, and executes the processing in cooperation with the other program. The program incorporated in the other program can also be included in the program according to the third embodiment.

The provided program product is installed in a program storage unit and executed. Note that the program product includes a program itself and a recording medium on which the program is recorded.

Although embodiments of the present invention have been described and illustrated in detail, it is clearly understood that the same is by way of illustration and example only and not limitation, the scope of the present invention should be interpreted by terms of the appended claims. The scope of the present invention is intended to include all the changes within the scope of the claims and its equivalent.

What is claimed is:

1. An image processing system comprising an image forming apparatus, the image forming apparatus including:
    an image processor having an image print function; and
    a server being connected to a display of the image forming apparatus, wherein
    the image processor is configured to provide screen data for a plurality of screens to the server,
    the server is configured to:
    identify, from among the plurality of screens, a screen to be displayed on the display, and to which screen, request information for printing is input, the screen is identified on the basis of a print mode of a print job stored in a buffer of the image processor,
    acquire screen data for the identified screen from the image processor, wherein screen data for the plurality of screens is stored in the image processor,
    when the server determines that the print mode is a first print mode, generate a screen corresponding to the first print mode on the basis of the acquired screen data to acquire a user login request information to identify the print job,
    when the server determines that the print mode is a second print mode, generate a screen corresponding to the second print mode on the basis of the acquired screen data to acquire a user login request information and a print permission request information to unlock the print job; and
    output print instruction to the image processor without performing authentication processing when the server determines that a user login request information and print permission request information for the print processing are not necessary on the basis of a third print mode.

2. The image processing system according to claim 1, wherein
    the print function includes a function of authentication processing,
    the request information includes authentication information for the authentication processing, and
    the server generates an operation reception screen that receives a user operation for inputting collation information to be collated with the authentication information as the screen.

3. The image processing system according to claim 2, wherein
    the authentication processing includes first authentication processing according to a first authentication method and second authentication processing according to a second authentication method simpler than the first authentication method.

4. The image processing system according to claim 3, wherein
    the server executes the first authentication processing, using a plurality of pieces of the collation information, and executes the second authentication processing, using one of the plurality of pieces of collation information.

5. The image processing system according to claim 4, wherein
    the plurality of pieces of collation information for the first authentication processing includes login request information for requesting, by a user, the image processor to permit login, and print permission request information for requesting, by the user, the image processor to give print permission, and
    the one collation information for the second authentication processing is the login request information.

6. The image processing system according to claim 5, wherein
    the authentication information includes the login permission information of the user to the image processor,
    the plurality of pieces of collation information includes the login request information of the user to the image processor, and
    the server does not output the operation reception screen for inputting the login request information to the image processor when the login request information received when the user has logged in to the server is matched with the login permission information.

7. The image processing system according to claim 2, wherein
    the image processor acquires screen data for generating a screen for receiving a user operation to the image processor, and
    the server generates a first screen and a second screen on the basis of the screen data received from the image processor.

8. The image processing system according to claim 1, wherein the server is further configured to:
    determine whether the request information has to be input by a user,
    when it is determined that the request information has to be input by a user, display the generated screen on the display, and execute a first input processing in which the server inputs information input by a user operation as the request information, and
    when it is determined that the request information does not have to be input by a user, execute a second input processing in which the screen control unit inputs the request information without receiving input by a user operation.

9. The image processing system according to claim 8, wherein
    in the second input processing, the server displays the generated screen, and inputs the request information without receiving input by a user operation.

10. The image processing system according to claim 8, wherein
in the second input processing, the screen control unit inputs the request information without displaying the generated screen or receiving input by a user operation.

11. A non-transitory recording medium storing a computer readable image processing program causing a computer to perform an image processing method in an image forming apparatus including:
an image processor that processes an image for printing,
a server being connected to a display of the image forming apparatus,
wherein the image processor is configured to provide screen data for a plurality of screens to the server,
the image processing method comprising using the server to:
identify, from among the plurality of screens, a screen to be displayed on the display, and to which screen, request information for printing is input, the screen is identified on the basis of a print mode of a print job stored in a buffer of the image processor;
acquire screen data for the identified screen from the image processor, wherein screen data for the plurality of screens is stored in the image processor,
when the server determines that the print mode is a first print mode, generate a screen corresponding to the first print mode on the basis of the acquired screen data to acquire a user login request information to identify the print job,
when the server determines that the print mode is a second print mode, generate a screen corresponding to the second print mode on the basis of the acquired screen data to acquire a user login request information and a print permission request information to unlock the print job; and
output print instruction to the image processor without performing authentication processing when the server determines that a user login request information and print permission request information for the print processing are not necessary on the basis of a third print mode.

12. The non-transitory recording medium storing a computer readable image processing program according to claim 11, wherein
the image processor includes a print function having a function of authentication processing,
the request information includes authentication information for the authentication processing, and
the server generates an operation reception screen that receives a user operation for inputting collation information to be collated with the authentication information as the screen.

13. The non-transitory recording medium storing a computer readable image processing program according to claim 12, wherein
the authentication processing includes first authentication processing according to a first authentication method and second authentication processing according to a second authentication method simpler than the first authentication method.

14. The non-transitory recording medium storing a computer readable image processing program according to claim 13, wherein
the server executes the first authentication processing, using a plurality of pieces of the collation information, and executes the second authentication processing, using one of the plurality of pieces of collation information.

15. The non-transitory recording medium storing a computer readable image processing program according to claim 14, wherein
the plurality of pieces of collation information for the first authentication processing includes login request information for requesting, by a user, the image processor to permit login, and print permission request information for requesting, by the user, the image processor to give print permission, and
the one collation information for the second authentication processing is the login request information.

16. The non-transitory recording medium storing a computer readable image processing program according to claim 15, wherein
the authentication information includes the login permission information of the user to the image processor,
the plurality of pieces of collation information includes the login request information of the user to the image processor, and
the server does not output the operation reception screen for inputting the login request information to the image processor when the login request information received when the user has logged in to the server is matched with the login permission information.

17. The non-transitory recording medium storing a computer readable image processing program according to claim 12, wherein
the image processor acquires screen data for generating a screen for receiving a user operation to the image processor, and
the server generates the first a screen and a second screen on the basis of the screen data received from the image processor.

* * * * *